(12) United States Patent
Toporski

(10) Patent No.: US 7,806,593 B2
(45) Date of Patent: Oct. 5, 2010

(54) REFUSE BAG WITH IMPROVED AIR REMOVAL AND CONTENT COMPACTION

(76) Inventor: Todd Toporski, 46256 Greenridge Dr., Northville, MI (US) 48167

( * ) Notice: Subject to any disclaimer, the term of this patent is extended or adjusted under 35 U.S.C. 154(b) by 1035 days.

(21) Appl. No.: 11/346,687

(22) Filed: Feb. 3, 2006

(65) Prior Publication Data

US 2006/0168932 A1 Aug. 3, 2006

Related U.S. Application Data

(60) Provisional application No. 60/649,833, filed on Feb. 3, 2005, provisional application No. 60/738,327, filed on Nov. 18, 2005.

(51) Int. Cl.
  *B65D 33/00* (2006.01)
  *B65D 30/02* (2006.01)
  *B65D 33/10* (2006.01)
  *B65D 33/16* (2006.01)
  *B65D 33/01* (2006.01)
  *A01D 43/00* (2006.01)

(52) U.S. Cl. ............... 383/33; 383/1; 383/9; 383/10; 383/98; 383/102; 56/202

(58) Field of Classification Search ............ 383/9, 383/10, 100, 102, 103, 22, 33, 98; 220/495.08, 220/495.1, 495.11, 495.04, 908.1, 9.4; 56/194, 56/199, 202, 203; 248/99, 100
See application file for complete search history.

(56) References Cited

U.S. PATENT DOCUMENTS

| | | | | |
|---|---|---|---|---|
| 1,651,020 A | * | 11/1927 | Faas | 220/9.4 |
| 1,886,406 A | * | 11/1932 | Kniffin | 383/9 |
| 1,916,493 A | * | 7/1933 | Solomon | 383/113 |
| 1,959,263 A | * | 5/1934 | Craske | 220/495.11 |
| 2,159,192 A | * | 5/1939 | Werdin | 383/76 |
| 2,222,077 A | * | 11/1940 | Kahn | 55/366 |
| 2,225,389 A | * | 12/1940 | Osterdahl | 55/376 |
| 2,308,398 A | * | 1/1943 | Stevens | 220/495.11 |
| 2,564,845 A | * | 8/1951 | Holt, Jr. | 55/493 |
| 3,212,248 A | * | 10/1965 | Leader | 56/202 |
| 3,399,822 A | * | 9/1968 | Kugler | 383/103 |
| 3,492,800 A | | 2/1970 | Peterson et al. | |
| 3,574,272 A | | 4/1971 | Krewson | |
| 3,802,173 A | | 4/1974 | Opitz | |
| 3,874,152 A | | 4/1975 | Dahl | |
| 4,030,273 A | | 6/1977 | Leader | |
| 4,037,394 A | * | 7/1977 | Lindblad | 56/202 |
| 4,186,546 A | | 2/1980 | Machado et al. | |
| 4,377,063 A | | 3/1983 | Leaphart | |
| 4,470,246 A | | 9/1984 | Donegan | |
| 4,747,259 A | | 5/1988 | Kline et al. | |
| 4,848,070 A | | 7/1989 | Berglund | |
| 4,907,403 A | | 3/1990 | Jones | |

(Continued)

*Primary Examiner*—Jes F Pascua
(74) *Attorney, Agent, or Firm*—MacMillan, Sobanski & Todd, LLC

(57) ABSTRACT

A lawn refuse bag is provided that includes a tubular container having a first side surface, a second side surface, a third side surface, a fourth side surface, and a fifth side surface. The tubular container further includes an open end for receiving compressible contents therein. A plurality of perforations are selectively disposed on at least one side surface of the tubular container adapted to discharge air from the tubular container away from a user compressing the contents therein.

19 Claims, 5 Drawing Sheets

U.S. PATENT DOCUMENTS

| | | | | |
|---|---|---|---|---|
| 4,948,266 A | * | 8/1990 | Bencic | 383/34 |
| 5,003,758 A | | 4/1991 | Bernstein | |
| 5,031,277 A | | 7/1991 | Coker | |
| 5,042,241 A | | 8/1991 | Boylston et al. | |
| 5,125,222 A | | 6/1992 | Speier | |
| 5,167,342 A | * | 12/1992 | Merritt | 220/495.08 |
| 5,179,824 A | | 1/1993 | Ridge et al. | |
| 5,213,141 A | | 5/1993 | Dorman | |
| 5,243,809 A | | 9/1993 | Redding | |
| 5,673,544 A | | 10/1997 | Voigt | |
| 6,151,875 A | | 11/2000 | Collins | |
| 6,155,522 A | | 12/2000 | Anderson | |
| 6,546,710 B1 | | 4/2003 | DeHart | |
| 6,810,652 B1 | | 11/2004 | Regalado | |
| 2005/0025397 A1 | * | 2/2005 | Zhao | 383/102 |
| 2006/0120635 A1 | * | 6/2006 | Su | 383/126 |
| 2007/0071365 A1 | * | 3/2007 | Stevens et al. | 383/33 |
| 2008/0083204 A1 | * | 4/2008 | Vineis | 56/202 |

* cited by examiner

REFUSE BAG WITH IMPROVED AIR REMOVAL AND CONTENT COMPACTION

CROSS-REFERENCE TO RELATED APPLICATIONS

This application claims priority of U.S. Provisional Application Ser. No. 60/649,833 filed Feb. 3, 2005, and U.S. Provisional Patent Application Ser. No. 60/738,327 filed Nov. 18, 2005, the disclosures of which are incorporated by reference.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to lawn refuse bags for purging air and enhanced content compaction.

2. Description of the Related Art

Lawn & refuse bags are used for disposing landscape debris. These refuse bags can hold up to 30 gallons or more in volume. The refuse bags are usually constructed of a biodegradable material such as brown paper, and used to collect leaves, grass clippings, and other refuse.

When leaves, grass clippings, sticks, weeds, or other contents are added to the lawn bag, such debris along with air occupy the volume within the bag. If the contents are loose or less tightly packed, then air will occupy a greater volume in contrast to heavier and more tightly packed debris. Loose contents such as dry leaves allow more air to reside in the bag than heavier and denser contents such as grass clippings.

In order to pack more debris of loose content into a refuse bag, air must be purged from the bag. To do so, the loose content must be compacted. This typically includes removing air from the refuse bag such as compaction of the contents of the bag. Compacting the contents of the refuse bag to make additional available volume for disposing more debris within the refuse bag requires the user to push down the contents to force the air out. This is accomplished by a couple methods.

Typically, a user simply pushes down directly on the contents of the open bag. This results in the user reaching into the bag repeated times to compact the contents within the refuse bag. Dust, dirt, and allergens are emitted directly at the users head, shoulders and torso. Such debris usually gets deposited on the hands, arms, and face. This method of compaction requires the user to constantly reposition the user's hands so as to compact different surface areas of debris within the refuse bag since the surface area of the debris within the bag is much larger than the surface area of the user's hands.

The user may also attempt to partially close or fold shut the mouth of the bag then push down to force the air out of the mouth (top opening) of the bag. Air attempts to be purged from the folded portion mouth of the bag. However, the more the mouth of the refuse bag is folded over, the more air tight the refuse bag becomes and the more difficult it is to purge the air from the refuse bag. In addition, dust, dirt, and allergens are forced out the mouth of the bag. Such dust, dirt, and allergens are directed toward the user and may easily be breathed in or settled on the user's clothing, arms, hands, and face.

Moreover, lawnmowers having refuse bagging systems for collecting grass clipping are well known in the art. Typical lawnmowers include push and self-propelled walking lawnmowers having rear-discharge systems. Such rear discharge systems include rear-mounted grass catching bags known as catch bags. Side-discharge mowers include side discharge systems with side mounted bags and are less popular because the side protruding catch bag may cause interference with trees and other objects lying adjacent to the lawn mower. Furthermore, the rear-discharge catch bag can be conveniently attached or removed from the mower without the added components such as clips, bands, or other hardware.

Insert liners are known for use with grass catch bags. The insert liners are inserted into the grass catch bag to collect grass and other lawn clippings for easy removal and disposal. The need for emptying the grass clippings collected in the catch bag to another container is eliminated. The inserts are generally made of porous or perforated material, including various forms of disposable paper and plastic. The insert liners also vary in the distinct ways they are constructed and attached to the lawnmower.

The prior insert liners used with grass catching bags are not well adaptable for rear-discharge mowers with rear-mounted grass catching bags. Many of the inserts are designed to fasten to or fit around a discharge chute protruding from the side or rear of the mower. Fastening brackets, elastic bands, and other attaching hardware are used to fasten the insert liner to the discharge chute either prior to attaching the catch bag or as an additional step in mounting the catch bag. Some of the inserts, such as the one introduced by Collins (U.S. Pat. No. 6,151, 875), have an enlarged and an extended opening that is intended to protrude from the grass catching bag to be placed around the external discharge chute. The rear-type grass catching bag opening is typically wide enough to enclose the back of a mower housing and the output of the discharge chute, and as a therefore, the insert liner as described by Collins would not be adaptable to present day lawn mowers. Collins further describes a non-uniform "tapered" design that increases from the bottom to the top of the insert liner, in addition to a mouth opening that extends outwardly flared. The fact that the insert liner is non-uniform in shape makes it more difficult to manufacture. One embodiment of the Collins insert also includes extra folds at all corners of the bag to allow the bag to expand for fitting properly in various size grass catching bags. These folds are an extra step in the manufacturing process that adds complexity and cost. The tapered shape of the bag from top to bottom can also be undesirable. Although this shape allows the insert to be easily removed from the grass catching bag, it also makes it difficult for the bag to stand upright on its own since it will be top-heavy. This may be unfavorable to some users who wish to stand the bags up for various reasons, including stacking or ease of lifting and carrying the bag.

BRIEF SUMMARY OF THE INVENTION

The present invention is a new lawn bag design that provides a better means of purging air out of the bag while improving the ease of compaction while significantly reducing air & possible allergens from being forced out the top of the bag. It allows more yard waste to be stored in the bag while minimizing airborne effects on the user. In addition, the refuse bag may be used as an insert liner in a lawn mower catch bag.

In one aspect of the present invention, a lawn refuse bag is provided that includes a tubular container having a first side surface, a second side surface, a third side surface, a fourth side surface, and a fifth side surface. The tubular container further includes an open end for receiving compressible contents therein. A plurality of perforations are selectively disposed on at least one side surface of the tubular container adapted to discharge air from the tubular container away from a user compressing the contents therein.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
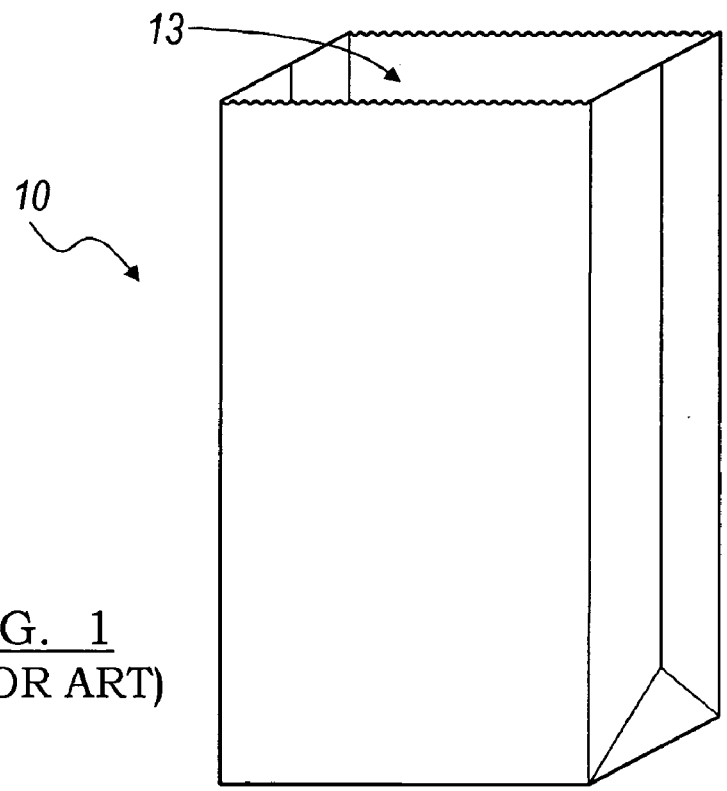
FIG. 1 is a prior art illustration of a lawn refuse bag.

Referring now to the drawings, there is illustrated in FIG. 1 a prior art standard brown paper lawn & refuse bag 10 used to collect leaves, grass clippings, and other lawn refuse. It is typically a gusseted rectangular tube design constructed like a large grocery bag, but includes more plies of paper to make it stronger and more resistant to water. The bag includes an open end and a closed end. The bag is standing upright in FIG. 1, with the "mouth" or opening 13 shown on top.

Figure 2:
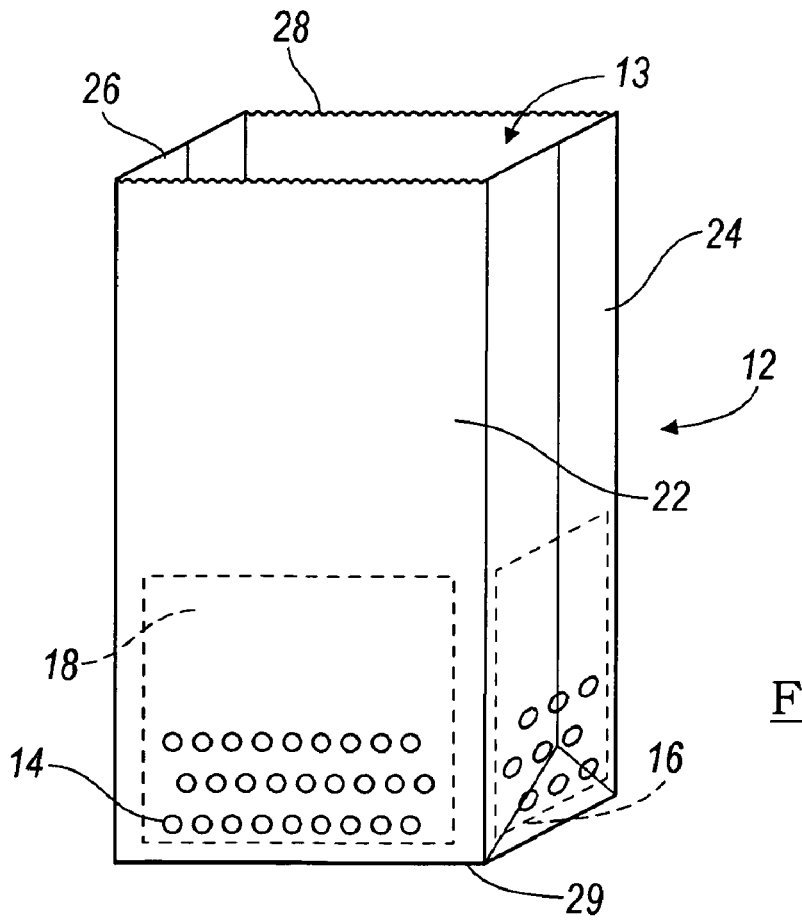
FIG. 2 illustrates a perspective view of a refuse bag according to a first preferred embodiment of the present invention

FIG. 2 illustrates a first preferred embodiment of the present invention. The refuse bag 12 includes the uniform gusseted rectangular tube design as shown in FIG. 1 with the addition of perforations 14 cut into the bottom portion 16 of the refuse bag 12 to allow air to pass through. The refuse bag 12 is preferably made from biodegradable paper. Alternatively, the refuse bag 12 may be made from a biodegradable material other than paper or may be made from a non-biodegradable material.

FIG. 2 also shows the refuse bag 12 with a targeted vent area 18 marked by a dashed line on the front and sides of the refuse bag 12. This dashed line represents the locations where perforations 14 are preferably added. The perforations 14 may be added to the entire target vent area 18, as shown, or may be added to only a portion of it. The perforations 14 may be implemented on only a first side of the refuse bag, two sides, three sides, all sides, or even on the bottom side surface.

The perforations 14 are incorporated on a front side surface 22, right side surface 24, a left side surface 26, a back side surface 28, and a bottom side surface 29. Other preferred embodiments include perforating only a single side surface or a combination of the respective side surfaces. In addition, the entire side surface of the refuse bag 12 may be perforated; however, perforations are preferred only near the bottom, such as the target vent area 18 to keep dust and allergens from passing through the top portion of the bag and into the breathable air of the user.

The advantage of compressing downward with vents near the bottom of the refuse bag 12 is that the contents (including leaves & grass) are easier to compact, and stay compacted better. When air is forced up through the mouth 13 of the bag as in the prior art, the contents of the refuse bag 12 are forced to move to allow air to pass upward. Therefore, the contents do not stay compacted as well on the bottom of the bag. Compacting the refuse bag 12 with perforations allows greater compaction which allows more debris to be added to the refuse bag 12.

In addition to venting the refuse bags 12 at various locations, the size and design of the perforation can be implemented in many various ways. For example, small, perforated circular holes can easily be added by using a punch during the manufacturing process. Preferably, the perforations are sized to allow the discharge of air while preventing the compressible contents from within the from exiting or at least a substantial portion of the contents from exiting the refuse bag 12.

Figure 3:
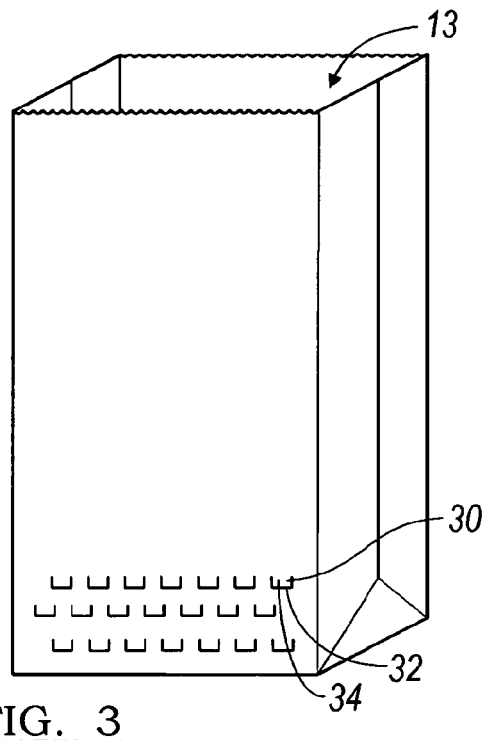
FIG. 3 illustrates a refuse bag according to a second preferred embodiment of the present invention.

FIGS. 3-6 illustrate various embodiments for the design of a perforation. FIG. 3 illustrates a square U-shaped perforation 30. The square U-shaped perforation 30 includes a bendable section 32 that functions as a bendable flap when air is discharged from the refuse bag 12. The bendable section 32 hinges about an upper side 34 of the bendable section 32. As the opening 13 of the refuse bag 12 is closed and the contents are compressed, the air within the refuse bag 12 compresses and forces the bendable section 32 to flap open. Since the bendable sections 32 are hinged on the upper side 34 of each perforation, the bendable sections 32 when open function as a shield and deflects the expelled air (with allergens and dust) exiting the perforations 30 in and outward and downward direction. The bendable section 32 prevents allergens and dust emitted with the air from being expelled upward toward the user.

Figure 4:
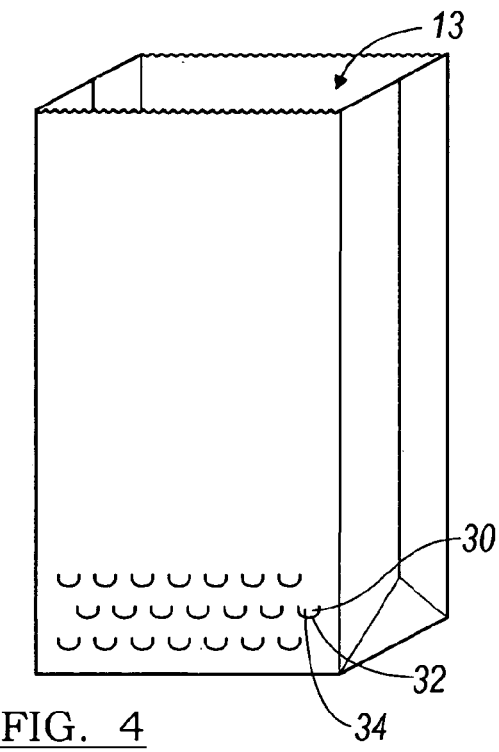
FIG. 4 illustrates perforations according to a third preferred embodiment of the present invention.
Figure 5:
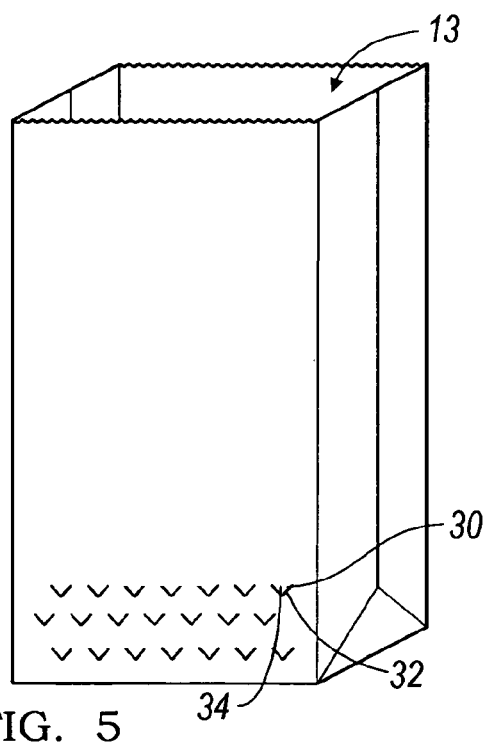
FIG. 5 illustrates perforations according to a fourth preferred embodiment of the present invention.

FIG. 4 illustrates a rounded U-shaped perforation and FIG. 5 illustrates a V-shaped perforation. Each respective perforation functions in a similar manner as the perforations described in FIG. 3.

Figure 6:
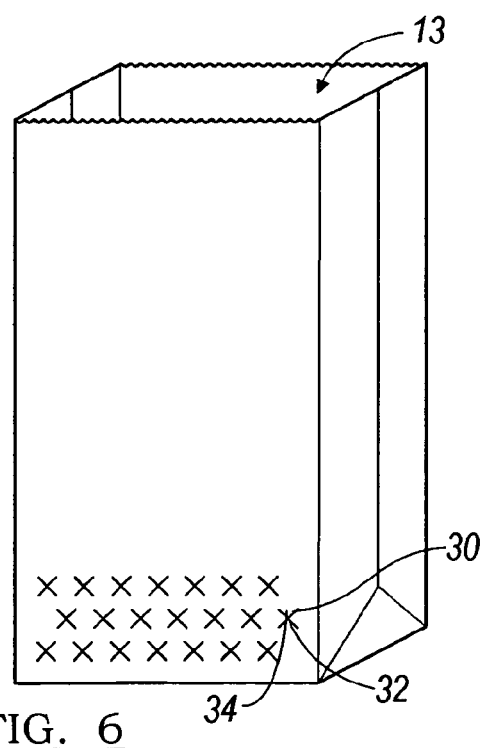
FIG. 6 illustrates perforations according to a fifth preferred embodiment of the present invention.

FIG. 6 illustrates a crossed vent perforation that is X-shaped. The X-shaped perforation provides multiple bendable sections for each perforation. The multiple bendable sections are forced open when the contents within the refuse bag are compressed and expels the exiting air in an outward direction. In other alternative embodiments, various shaped perforations may be used that includes one or more bendable sections for purging air from the refuse bag 12.

While the preferred invention is an improved yard bag of approximately the same size as prior art, it is also possible to have other versions that differ in size and shape. For example, instead of standard 30-gallon capacity bag, it would be useful to have a smaller capacity bag for heavier contents. 15-gallon or 20-gallon bags, for example, would be easier to lift and carry for users bagging the lawn clippings. It is also conceivable that the size of the bag mouth (and bottom) could be made uniformly larger to allow easier pouring of clippings or other contents from other debris collections devices such as lawn mower catch bags or leaf vacuum bags.

The benefits of the invention can be summarized as better compaction for more contents to be placed in a bag of equal size; added ventilation near bottom of bag to allow air passage through vents when top of bag is closed or sealed; reduced air forced through the mouth or opening the refuse bag to significantly reduce dust & allergens that are passed to the user; a greater amount of contents stored in a single refuse bag which results in a reduction in number of bags used and to transport, reduced cost to user, and reduced paper bags that will be placed in landfills or compost sites, thereby helping the environment.

Figure 7:
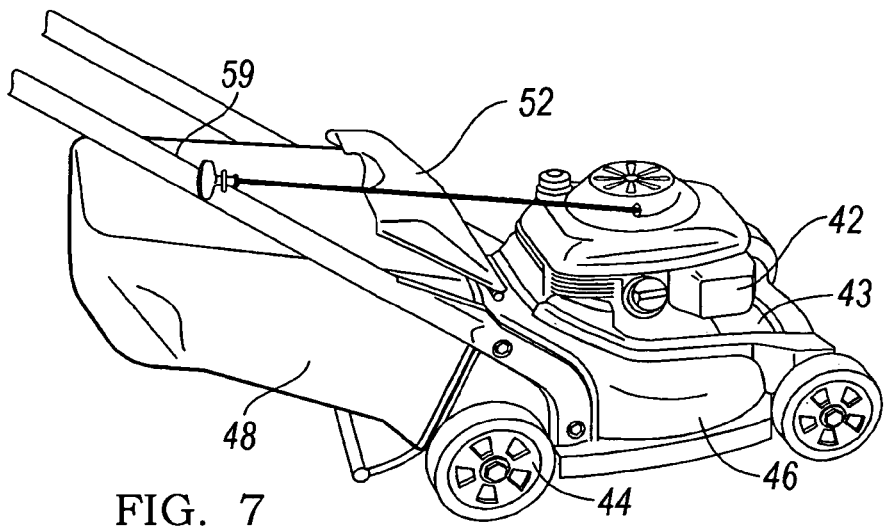
FIG. 7 is a prior art illustration of a lawn mower with rear mounted discharge bag catch system.

The respective lawn refuse bags shown in FIGS. 2-6 may be adapted to be used as an insert liner for a lawn cutting device. FIG. 7 illustrates a typical prior art rear-discharge lawn mower. A lawn mower 40 includes an engine 42, and a chassis 43 mounted on a set of wheels 44. A rotating blade (not shown) is coupled to the engine 42 for cutting grass and forcibly directing the grass clippings through a discharge chute 46 and into a detachable catch bag 48. The catch bag 48 is mounted on the rear portion of the chassis 43. The catch bag 48 is disposed below a handle 49 and inline with the chassis 43. A discharge cover 52 is pivotably adapted to the chassis 43 to access the discharge opening (shown in FIG. 2) for collecting the grass clippings.

Figure 8:
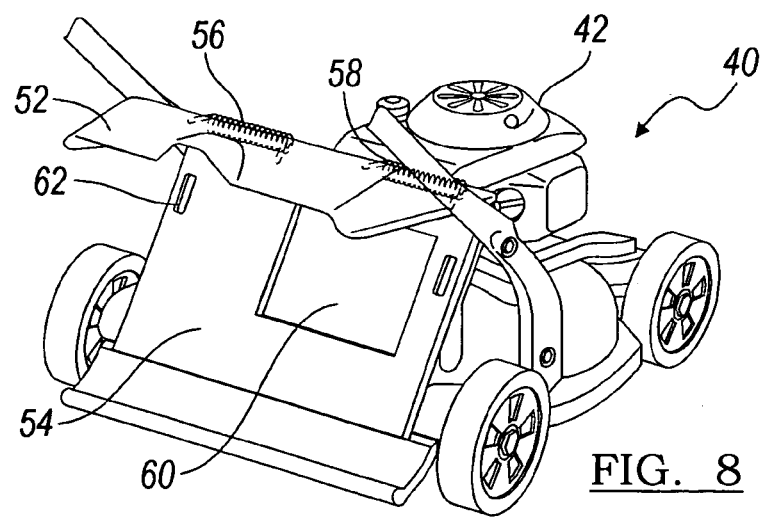
FIG. 8 is a prior art illustration of a rear-discharge lawn mower opening.

FIG. 8 is a rear perspective view of the rear-discharge lawn mower 40 illustrating a rear mounting surface. The discharge cover 52 is pivotably mounted to a back panel 54 of the chassis 43 by springs 56 and 58. A discharge opening 60 is formed in the back panel 54 for allowing the egress of grass clippings from the discharge chute 46 to the catch bag 48 (FIG. 1). The back panel 54 includes a first slot 62 and a second slot 64 for mounting the catch bag 48 onto the chassis 43 of the lawn mower 40.

Figure 9:
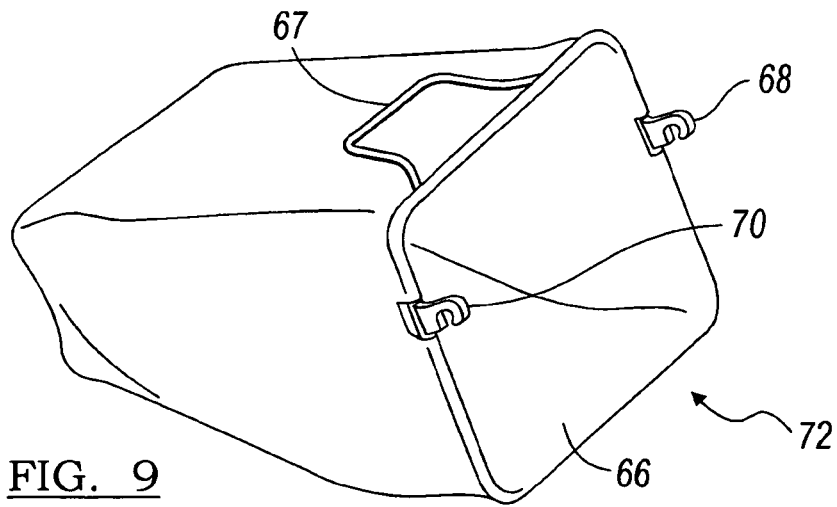
FIG. 9 is a prior art illustration of a rear-discharge lawn mower catch bag.

FIG. 9 illustrates a front perspective view of the grass catch bag 48. The catch bag 48 is a standard rear-mounted bag for the type of lawnmower shown. The rear-mounting bags typically are similarly shaped and usually hold anywhere from 2 to 2.5 bushels of clippings in volume. The material of the catch bag 48 is porous typically consisting of durable fabrics, such as nylon, which allows air to easily pass through the entire surface. An opening 66 of the catch bag 48 is rectangular-shaped. The shape of the catch bag 48 resembles a non-uniform rectangular closed-ended tube. The opening 66 is supported by a metal frame (not shown) that includes a handle 67 disposed on the top of the opening 66. Other supporting members of the catch bag 48 may include rods (not shown) extending along top edges of the catch bag 48 from the front to the back to provide support as the grass clippings are collected in the catch bag 48. A bottom surface of the catch bag 48 loosely hangs so that the grass clippings (i.e., without an insert) can be collected and forcibly pushed from the bag when disposing the grass clippings. A first mounting member 68 and a second mounting member 70 are mounted on the sides of the opening 66 and are in close proximity to the top corners of the opening 66. Alternatively, the fastening members may be located at different locations about the opening depending upon the respective catch bag and lawn mower. The fastening members 68 and 70 are received in the slots 62 and 64, respectively, for attaching the catch bag 48 to the rear panel 54 of the chassis 43. The opening 66 is encompassed by the catch bag 48 for receiving grass clippings thrown from the discharge chute 46. When the catch bag 48 is mounted on the lawn mower 40, a spring-loaded discharge cover 52 must be pivotably lifted to allow the catch bag 48 to be mounted to the rear panel 54. Once the catch bag 48 is attached, the discharge cover 52 is released and rests on the top surface of the catch bag 48.

Figure 10:
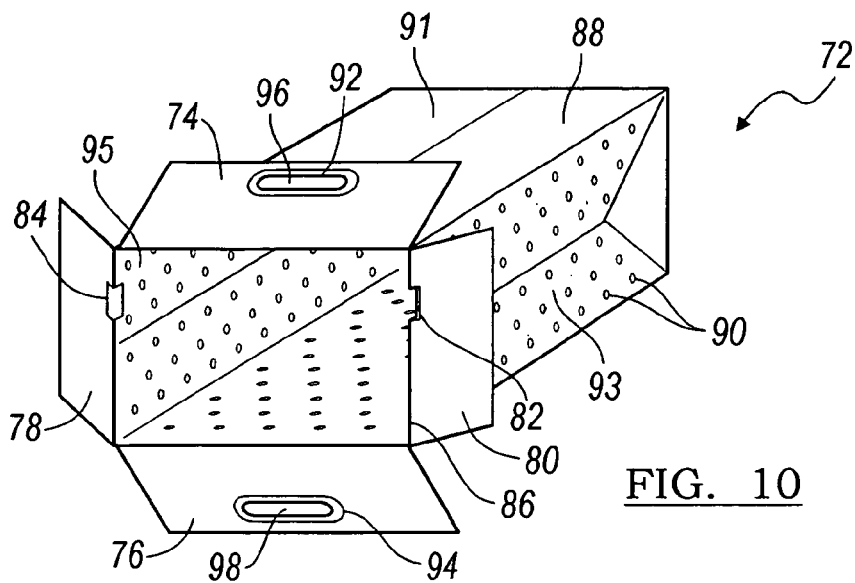
FIG. 10 is a perspective view of an insert liner according to a sixth preferred embodiment of the present invention.

FIG. 10 is an insert liner 72 according to a sixth preferred embodiment. The insert is similar to refuse bags shown in FIG. 2-6, and further includes a first flap 74, a second flap 76, a third flap 78, and a fourth flap 80 extending from the opening 86. Each of the flaps are integrally formed as part of the insert liner 72. Each of the flaps position the opening 86 and hold the insert liner 72 in place when inserted into the catch bag 48. The third flap 78 and the fourth flap 80 includes a first slot 82 and a second slot 84, respectively, which receive the mounting members of the catch bag 48 when the insert liner 72 is inserted within the catch bag 48. The flaps are folded backwards when the catch bag 48 is coupled to the lawn mower 40 to avoid interference with any of the components of the lawn mower 40. Upon removal of the insert liner 72 from the catch bag 48, the flaps can be folded down or rolled shut to close the opening 86 of the insert liner 72. The opening 86 and flaps of the insert liner 72 do not attach to the chassis 43 or discharge chute 46 but are rather pinched between the catch bag 48 and the rear panel 54 of the chassis 43.

The body 88 of the insert liner 72 is a uniform, rectangular-shaped tube (or square). The insert liner 72 may be gusseted, or have folds along its sides, to allow the insert liner 72 to be folded for packaging and shipping. The preferred embodiment is a gusseted paper tube with perforations 90 on the bottom 91 and both sides 93 and 95 of the body 88 for allowing air to pass through. The top surface 91 and the back surface (not shown) are not perforated. This prevents dust and other allergens from passing directly through the top or back of the insert liner 72 to the operator. Alternatively, perforations 90 may be used throughout the insert liner 72 if dust minimization is not an issue or if the air flow of the catch bag 48 requires it for proper ventilation. Furthermore, if perforations 90 are to be used on the top surface 91 and/or back surface (not shown), smaller perforations may be used these respective surfaces to minimize the amount of dust and allergens emitted directly to the operator of the lawn mower 40. In addition, sheets of paper or plastic screening material may be inserted inside the insert liner 72 to act as a fine filter of dust particles prior to the dust passing through larger perforations in the insert liner 72.

The back side surface (not shown) of the insert liner 72 is sealed and is relatively square and flat. A flat back surface allows the insert liner 72 to stand upright when removed from the catch bag 48 when containing grass clippings. The preferred embodiment uses a pasted square method of sealing the back of the liner 72. Other embodiments of enclosing the back of the insert liner 72 may use a sewn method or double fold & pasted method.

Although the preferred insert liner 72 is shown and described as having a rectangular-shaped closed end tubular body, other tubular shapes may be used including but not limited to square, trapezoidal, or circular. Alternatively, the insert liner 72 may be non-uniform.

The insert liner 72 may also include a first handle portion 92 and a second handle portion 94. The first handle portion 92 includes an aperture 96 formed in the first flap 74 of the insert liner 72. The second handle portion 94 includes an aperture 98 formed in the second flap 76 of the insert liner 72. Each of the apertures 96 and 98 may be reinforced with one or more layers of the material utilized to manufacture the insert liner 72 about the perimeter of the apertures to prevent tearing of the handles. When the insert liner 72 is removed from the catch bag 48, each of the flaps are folded inward and the first flap 74 and the second flap 76 may be brought into contact with each other such that each aperture 96 and 98 of the first and second flaps 74 and 76 are axially aligned. The operator of the lawn mower 40 may grasp both handles portions 92 and 94 with one hand or may grasp a respective handle with each hand for removing the insert liner 72 from the catch bag 48. The handles 92 and 94 may also be used to carry the insert liner 72 and grass clippings filled therein to a respective location.

Removing the insert liner 72 reduces the strain of having to pick up a full bag of clippings of a catch bag (shown in FIG. 2) and hold it over a large container for emptying, which is one of the more standard methods used today. The insert liner 72 also greatly reduces dust when the clippings are removed from the catch bag 48. For the catch bags having an angled opening as opposed to a planar opening (not shown), the top portion of the insert liner 72 may be pushed down slightly by the discharge panel 56 but the remainder of the insert liner 72 maintains its shape and the opening 86 of the insert liner remains unblocked. The insert liner 48 is ideally sized to adapt to various shaped catch bags.

Figure 11:
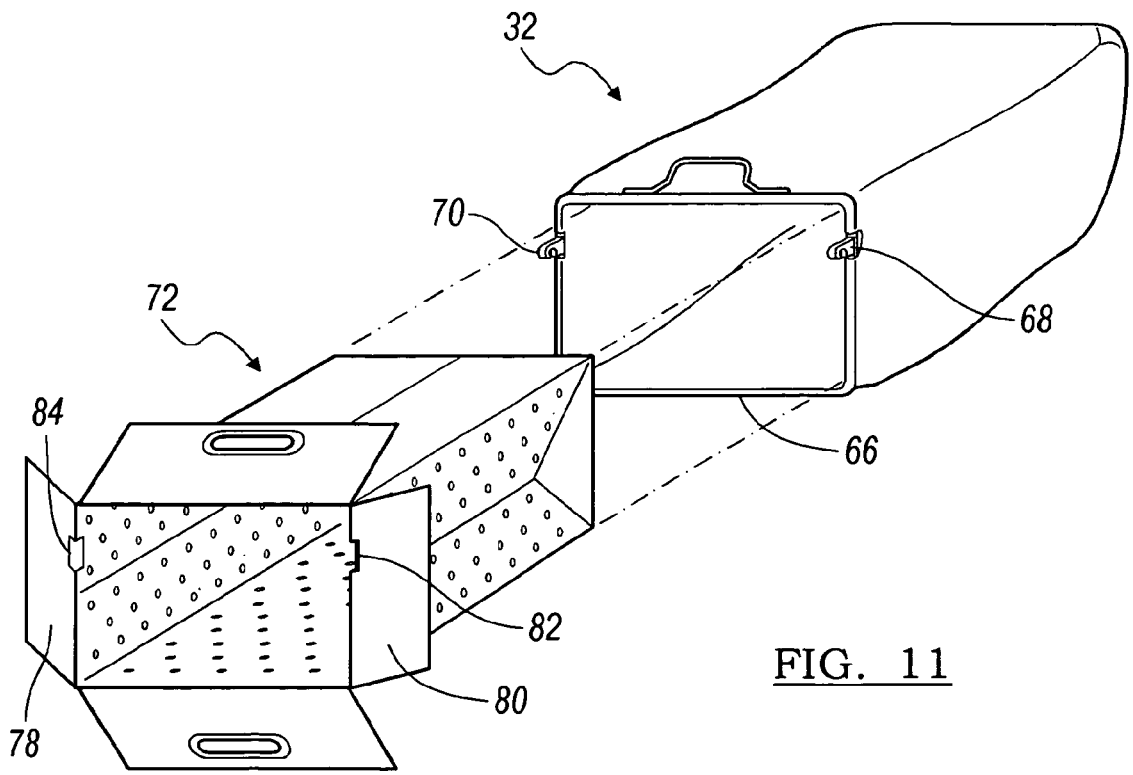
FIG. 11 is a perspective view of the insert liner positionally aligned with catch bag according to the sixth preferred embodiment of the present invention.

FIG. 11 illustrates the catch bag 48 aligned for receiving the insert liner 72. The rear of the insert liner 72 is positionally aligned with the opening 66 of the catch bag 48. The fastening members 68 and 70 are positionally aligned with slots 82 and 84, respectively. The flaps of the insert liner 72 are folded back and the insert liner 72 is inserted into the catch bag 48 while maintaining alignment between the fastening members and the slots. Folding back each of the flaps 74, 76, 78, 80 aligns the opening 86 of the insert liner 72 to the opening 66 of the catch bag 48 and holds it to the frame of the catch bag 48 without requiring any additional hardware. As the insert liner 72 is fully received in the catch bag 48, fastening members 68 and 70 protrude through slots 82 and 84, respectively.

Figure 12:
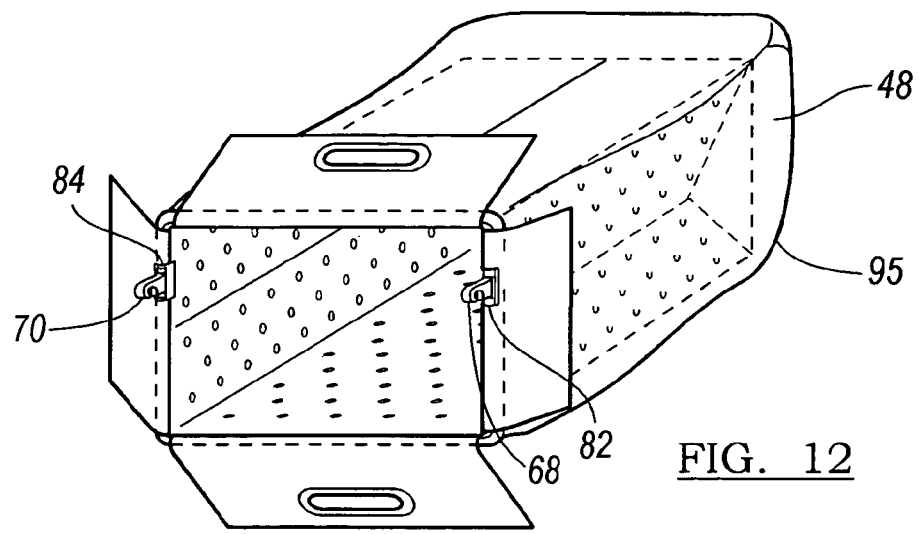
FIG. 12 is a perspective view of the insert liner inserted within the catch bag according to the sixth preferred embodiment of the present invention.
Figure 13:
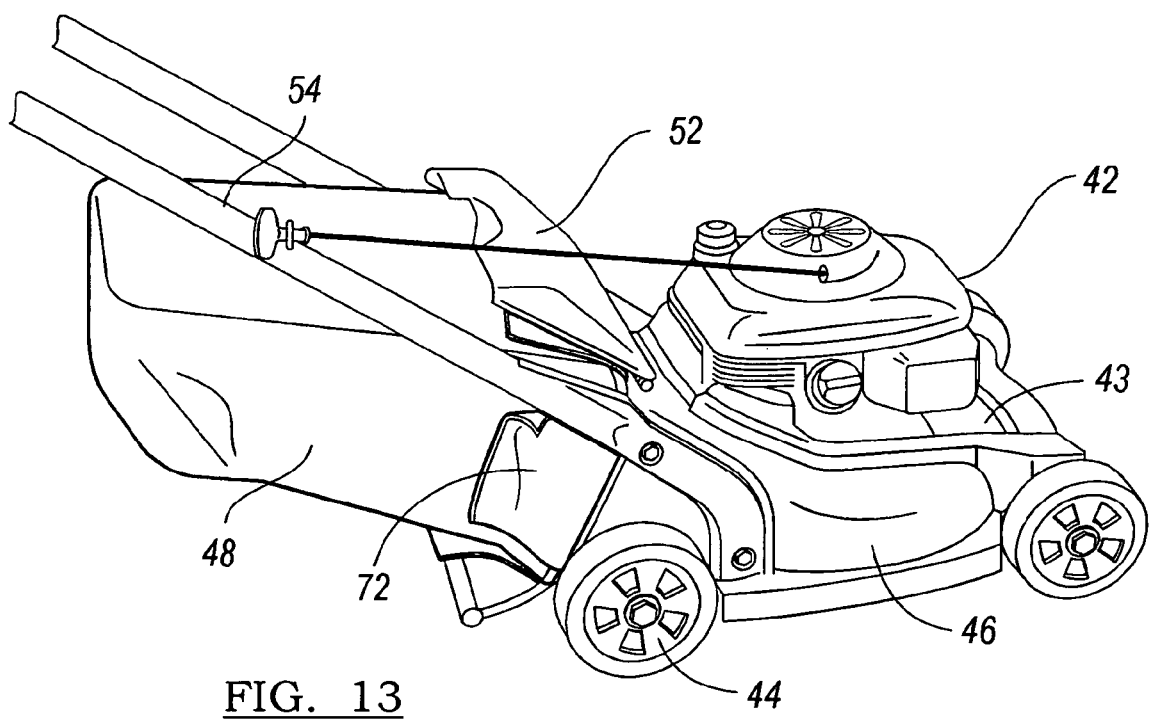
FIG. 13 is a perspective view of a catch bag with the insert liner mounted on the lawnmower according to the sixth preferred embodiment of the present invention.

FIG. 12 illustrates the insert liner 72 inserted with the catch bag 48 with fastening members 68 and 70 protruding through slots 82 and 84, respectively, for attaching to the lawn mower 40. Since the insert liner 72 is made from a pliable material, such as paper, any misalignment or oversize condition between the catch bag 48 and the insert liner 72 is corrected by the insert liner 72 being able to adapt and conform to the interior of the catch bag 48. For example, the catch bag 48 is rounded along the bottom rear edge 95. As the insert liner 72 is fully inserted within the catch bag 48, the insert liner 72 conforms to the contour of the rounded bottom rear edge 95. The operator can open the body 88 and contour the back portion of the insert liner 72 to the catch bag 48 using their hand or just loosely expand the body 88 of the insert liner 72 so that when the lawn mower 40 is running the airflow and grass clippings will expand the insert liner 72 and fill its capacity. The insert liner 72 relies on the shape of the catch bag 48 to limit its expansion. Even though the insert liner 72 has a uniform, rectangular tube-shape when empty, the insert liner 72 can have an irregular or non-uniform shape once it is inserted in the catch bag 48 or when filled with grass clippings.

FIG. 14 illustrates the catch bag 48 including the insert liner 72 mounted on the lawn mower 40. As the first and second fastening members 68 and 70 of the catch bag 48 mount onto the rear panel 54 of the lawn mower 40, the flaps are folded rearward to avoid interference between the flaps and any components mounted forward of the catch bag 48. In the preferred embodiment, the insert liner 72 is disposed between the opening 66 of the catch bag 48 and the rear panel 54 of the chassis 44. In other preferred embodiments, depending on the assembly tolerances between the opening 66 of the catch bag 48 and the rear panel 54, the opening 86 of the insert liner 72 may be pinched between the opening 66 of the catch bag 48 and rear panel 54.

The insert liner serves numerous functions. First, the surface area of the insert liner blocks airflow through many of the pores in the catch bag which reduces dust and other allergens that pass through the catch bag. Secondly, the size, pattern, and location of perforations in the insert liner allow enough air to pass through so that grass clippings are successfully transported from the lawn mower discharge chute into the insert liner. The catch bag which is very porous and designed for maximum airflow can have its airflow partially limited by an interior liner to reduce passage of dust while still maintaining enough airflow to successfully fill the insert liner with clippings. A third function of the insert liner is that it provides for better compaction of grass clippings while mowing. In a rear-discharge lawn mower, the discharge chute is very short and blockage of grass clippings transferred to the catch bag is minimized. The minimized short distance to catch bag through the discharge chute allows for grass clippings to be transferred at a high velocity, and aids in compressing or compacting the grass clippings in the catch bag. Compaction allows for more grass clippings to be collected (in mass) since the volume of grass clippings is compressed. The insert liner allows the grass clippings to be removed from the catch bag without the operator having to uncompress the grass clippings for transferring to another container which typically includes either banging or shaking the catch bag to remove the contents or by the operator inserting their hand in the catch bag to uncompress and pull out the grass clippings. The transfer of grass clippings from the catch bag (i.e., without the insert liner) to another container has a negative impact on compaction, as the grass clippings are loosened and spread out. As a result, the volume expands and a larger container is required.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A lawn debris catcher apparatus for a lawn debris collection machine comprising:
 a porous catch bag attachable to the lawn debris collection machine, the porous catch bag having a framed opening for receiving lawn debris discharged by the lawn debris collection machine;
 an insertable tubular-shaped container insertable within the porous catch bag, the insertable tubular container having a uniform material composition, the insertable tubular container including a plurality of side surfaces and a closed end, the insertable tubular container further including an open end opposite the closed end for receiving compressible lawn debris contents therein discharged from the lawn debris collection machine;
 a plurality of perforations disposed substantially on at least one side surface of the insertable tubular container, the plurality of perforations allowing a flow of forced air generated by the lawn debris collection machine to be sufficiently discharged from the insertable tubular container; and
 a plurality of flaps formed as part of the insertable tubular container extend from the open end, each respective flap extends from a respective side surface of the insertable tubular container, wherein each respective flap is unattached from an adjacent flap so that each respective flap may be independently folded outward from the open end and over the framed opening of the porous catch bag to hold the tubular-shaped container in place without fasteners when the flow of forced air and lawn debris generated by the lawn debris collection machine is received in the insertable tubular container and the flow of forced air is discharged through the insertable tubular container and the porous catch bag.

2. The lawn debris catcher apparatus of claim 1 wherein the plurality of flaps are foldable for extending to an exterior of the porous catch bag.

3. The lawn debris catcher apparatus of claim 1 wherein the plurality of perforations are formed in a target vent area of at least one side surface.

4. The lawn debris catcher apparatus of claim 1 wherein the tubular container is pliable for adaptively conforming to the porous catch bag.

5. The lawn debris catcher apparatus of claim 1 wherein the insertable tubular container is biodegradable.

6. The lawn debris catcher apparatus of claim 1 wherein the plurality of perforations form a shape selected from the group comprising X-shaped perforations and V-shaped perforations.

7. The lawn debris catcher apparatus of claim 1 wherein the perforations are polygon-shaped.

8. The lawn debris catcher apparatus of claim 1 wherein the plurality of perforations are circular.

9. The lawn debris catcher apparatus of claim 1 wherein the tubular container is uniform shaped.

10. The lawn debris catcher apparatus of claim 1 wherein the tubular container is non-uniform shaped.

11. The lawn debris catcher apparatus of claim 1 wherein the perforations allow for enhancing compaction of contents collected in the tubular container when the flow of forced air and lawn debris generated by the lawn debris collection machine is received in the insertable tubular container and the flow of forced air is discharged through the insertable tubular container and the porous catch bag.

12. The lawn debris catcher apparatus of claim 1 wherein each respective flap is dedicated to a respective side surface, each flap being foldable for extending rearward approximately to a respective side surface of the liner without affecting an adjacent flap.

13. The lawn debris catcher apparatus of claim 1 wherein the plurality of flaps are foldable over an opening of the porous catch bag for conforming to the framed opening of the porous catch bag.

14. The lawn debris catcher apparatus of claim 1 wherein the plurality of flaps are foldable over the open end to close off the open end of the tubular container upon removal of the insertable tubular container from the porous catch bag.

15. The lawn debris catcher apparatus of claim 1 wherein the porous catch bag includes at least one mounting member for coupling to the lawn debris collection machine, and wherein the tubular container includes a slot portion on at least one folded portion of a flap for receiving the mounting member therethrough so the mounting members may couple to the lawn debris collection machine.

16. The lawn debris catcher apparatus of claim 1 wherein an aperture is formed in a first flap, the aperture extends from a first exterior surface of the first flap to a second exterior surface of the first flap, wherein the aperture functions as a handle for receiving a user's hand therethrough.

17. The lawn debris catcher apparatus of claim 16 wherein an aperture is formed in a second flap, the aperture extends from a first exterior surface of the second flap to a second exterior surface of the second flap, wherein the aperture functions as a handle for receiving a user's hand therethrough.

18. The lawn debris catcher apparatus of claim 17 wherein the first flap and the second flap form a handle when the first flap and the second flap are positioned such that the aperture of the first flap and the aperture of the second flap are axially aligned with one another.

19. The lawn debris catcher apparatus of claim 1 wherein the plurality of perforations are U-shaped.

\* \* \* \* \*